United States Patent [19]
Ades et al.

[11] Patent Number: 4,590,653
[45] Date of Patent: May 27, 1986

[54] TURBINE ROTOR HEATING, DISASSEMBLY, HANDLING AND REASSEMBLY METHOD AND APPARATUS

[75] Inventors: Adrian R. Ades; George S. Schmidt, both of Schenectady, N.Y.

[73] Assignee: General Electric Company, Schenectady, N.Y.

[21] Appl. No.: 731,216

[22] Filed: May 7, 1985

Related U.S. Application Data

[62] Division of Ser. No. 491,509, May 4, 1983, Pat. No. 4,567,649.

[51] Int. Cl.⁴ .................. B23K 3/00; B23P 11/02; B23P 19/00; F27D 11/00
[52] U.S. Cl. .................. 29/156.8 R; 29/407; 29/447; 29/705; 29/709; 29/720; 219/395; 219/405; 219/406; 219/407; 219/415; 219/442; 414/728; 403/273
[58] Field of Search ............... 29/156.8 R, 426.1, 447, 29/407, 789, 790, 426.2, 426.3, 426.4, 426.5, 800, 705, 709, 720; 219/390, 391, 394, 395, 405, 406, 407, 412, 413, 441, 442; 73/66, 455; 403/273; 414/589, 728, 751

[56] References Cited

U.S. PATENT DOCUMENTS

| | | | |
|---|---|---|---|
| 2,825,124 | 3/1958 | Nichols et al. | 29/156.8 R |
| 3,724,059 | 4/1973 | Celovsky | 29/800 X |
| 4,044,442 | 8/1977 | Carlson | 29/156.8 R X |
| 4,408,382 | 10/1983 | Campbell | 29/426.3 X |
| 4,409,731 | 10/1983 | Campbell | 29/800 |
| 4,464,826 | 8/1984 | Bair | 29/705 X |

FOREIGN PATENT DOCUMENTS

| | | | |
|---|---|---|---|
| 7213113 | 3/1980 | U.S.S.R. | 29/800 |
| 774895 | 10/1980 | U.S.S.R. | 29/800 |
| 854669 | 8/1981 | U.S.S.R. | 29/800 |
| 870048 | 10/1981 | U.S.S.R. | 29/800 |

Primary Examiner—Howard N. Goldberg
Assistant Examiner—R. S. Wallace
Attorney, Agent, or Firm—Robert A. Cahill

[57] ABSTRACT

A turbine rotor disassembly, handling and reassembly apparatus employs a feedback-controlled electric heating oven to rapidly heat a turbine wheel while the rotor shaft is in the horizontal position. An adapter interfaces the wheel to a handling spool whose outboard end is adjusted to slide on the rotor shaft and to provide a fulcrum for supporting the wheel. A handling trolley includes a soft hydraulic system for supporting the weight of the wheel to avoid damaging the precision machined surfaces of the shrink-fit area while the wheel is being withdrawn. The handling apparatus also provides means for upending, or rotating, the removed wheel through 90 degrees to place its axis vertical for facilitating handling. A sensor system senses a radial motion of the wheel to detect clearance and to establish an appropriate fluid pressure to just balance the weight of the wheel and attached parts. The handling system includes means for rotating the wheel slightly during reassembly to align keyways or the like. A technique is included for equalizing shaft heating during reassembly of a turbine rotor by cyclically elevating and lowering the wheel, by orbiting the wheel about the shaft or by holding the wheel in the center of its clearance about the shaft until a shrink fit is established.

12 Claims, 17 Drawing Figures

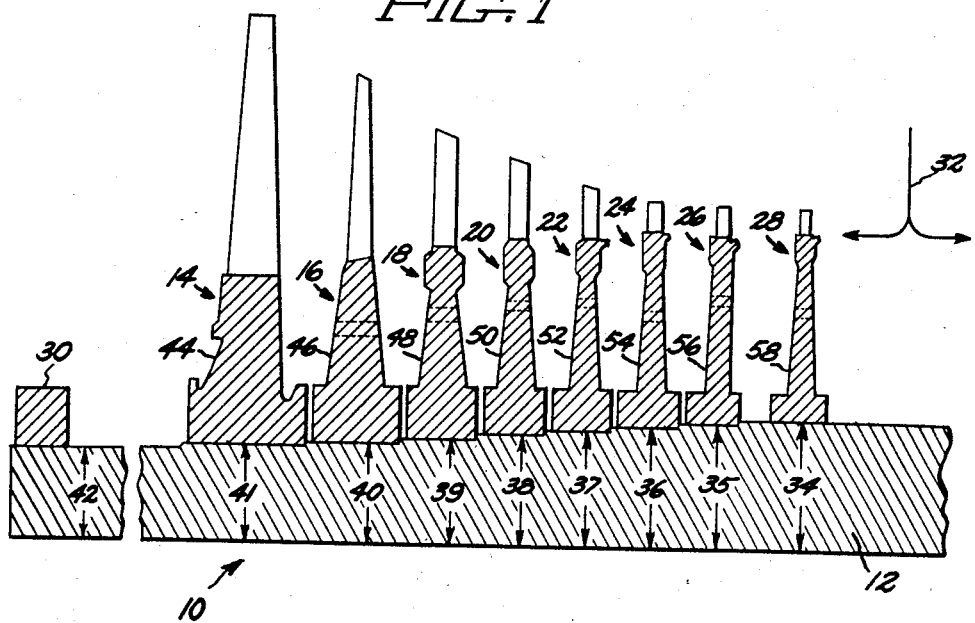
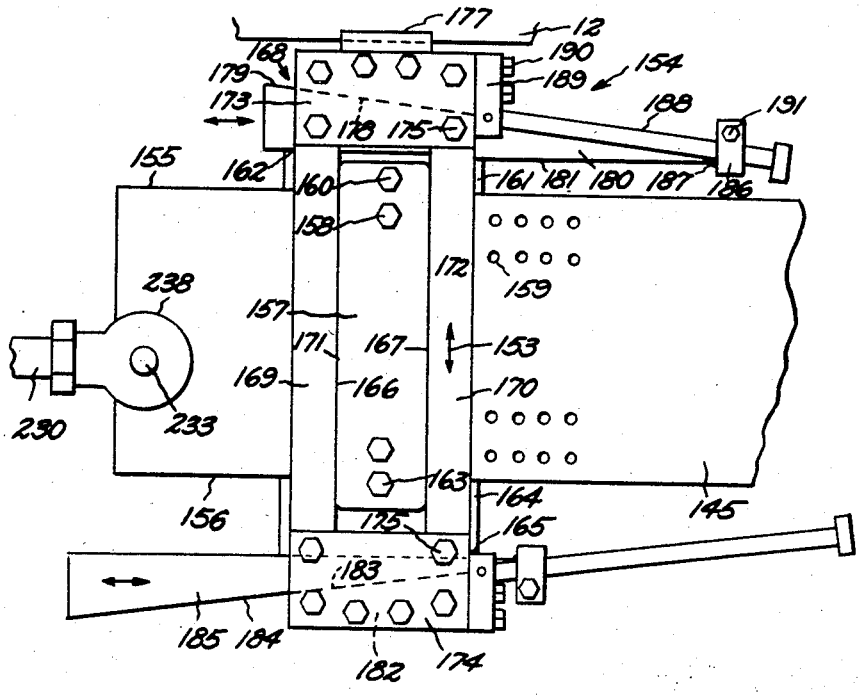

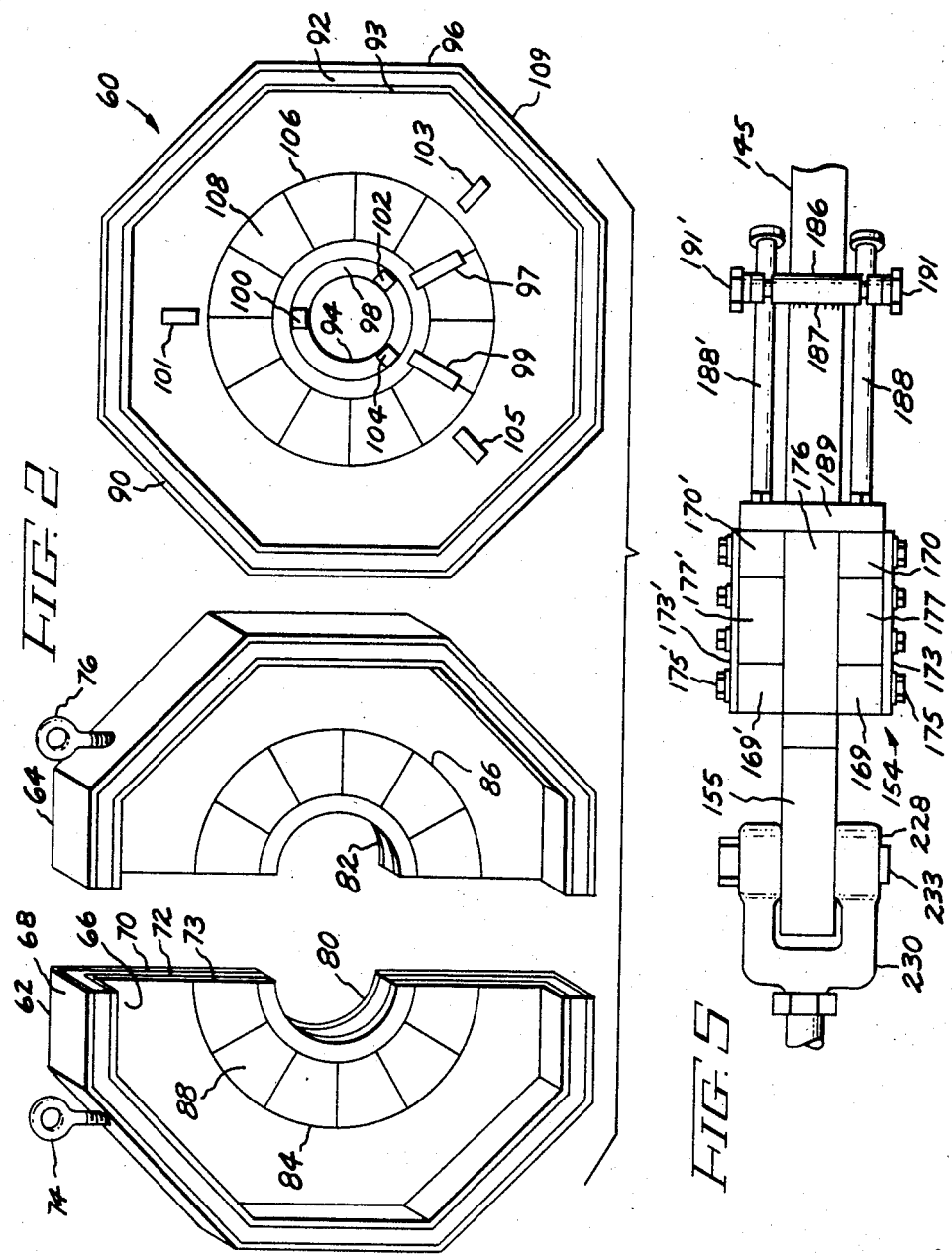

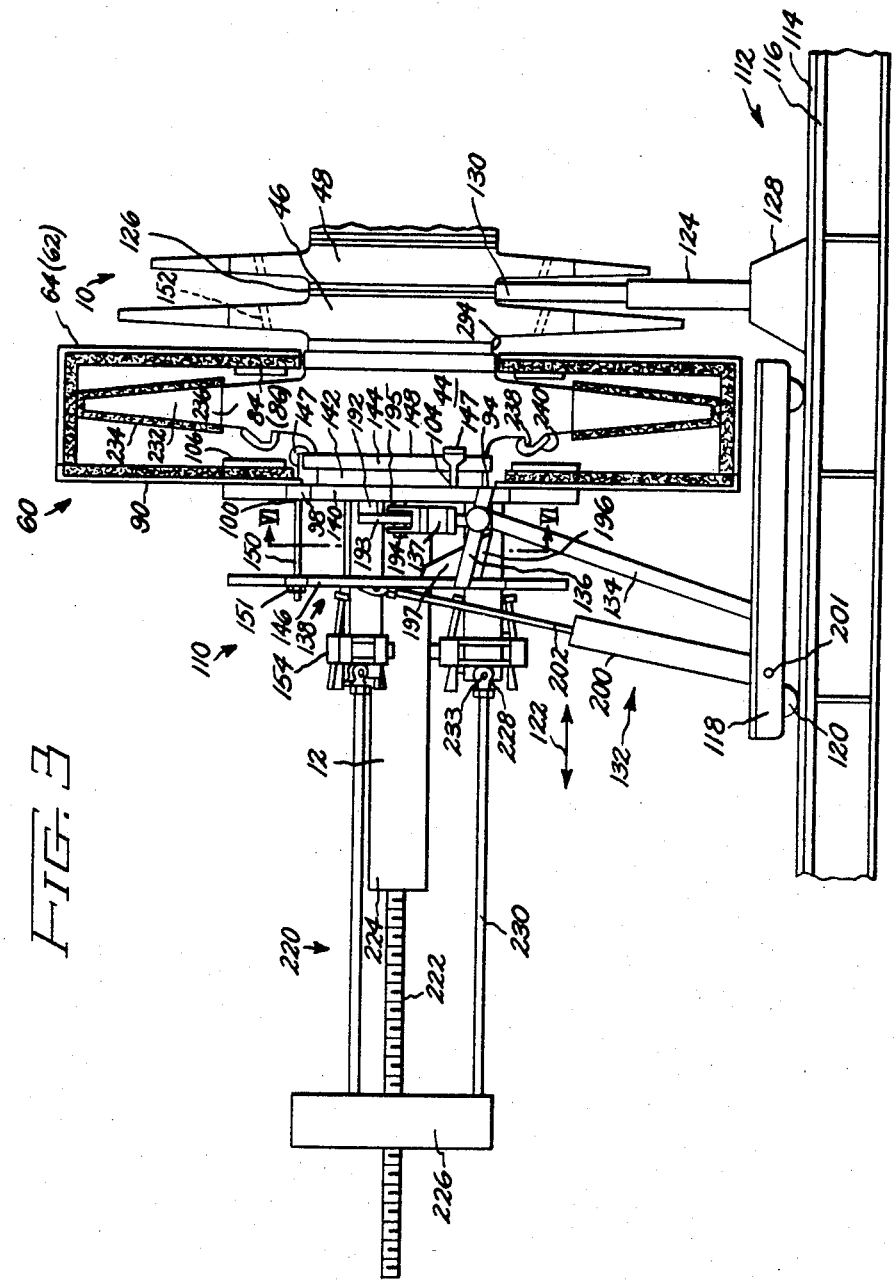

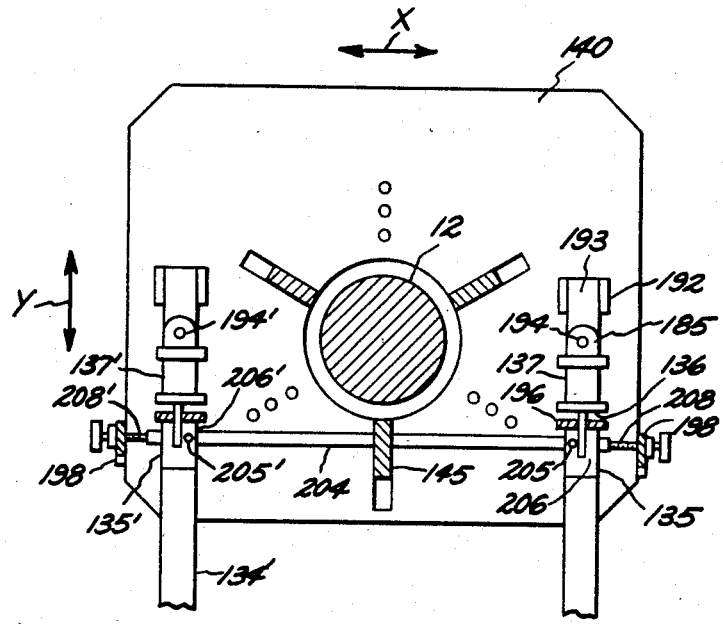

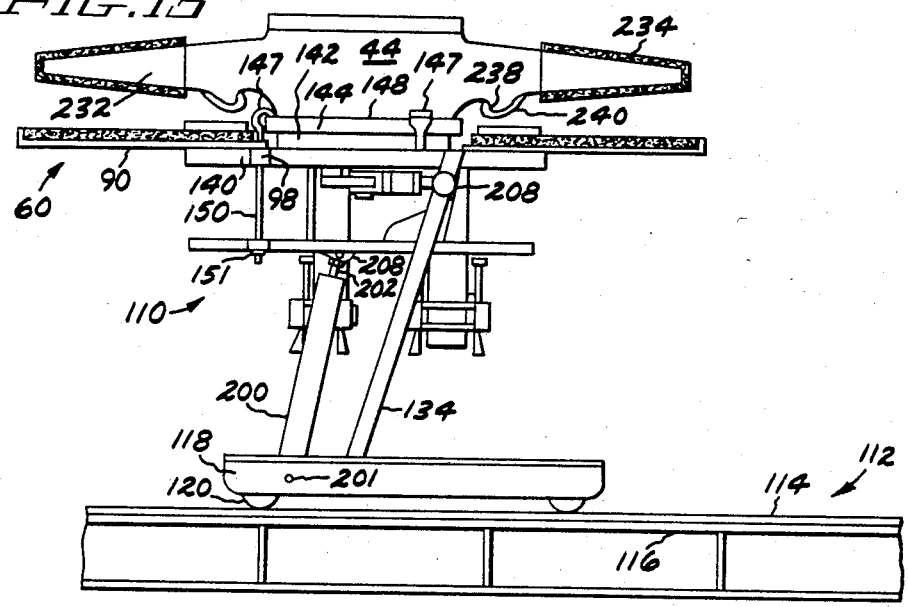
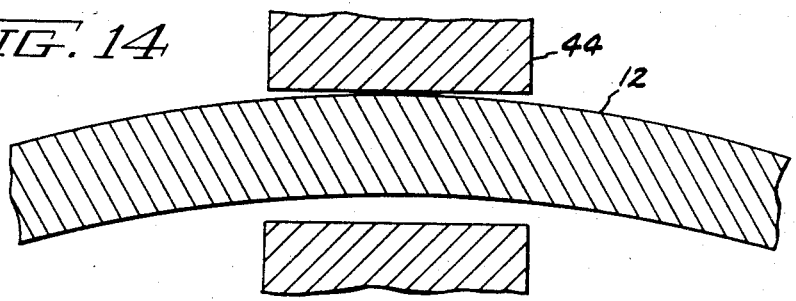
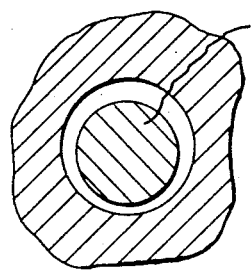
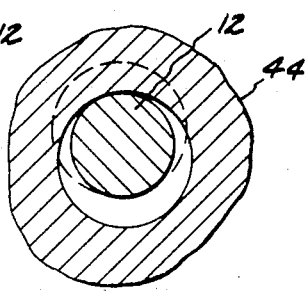
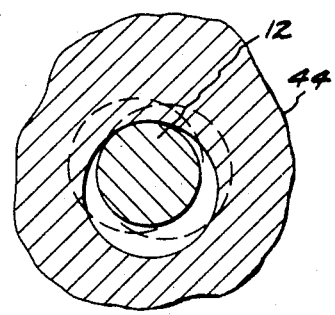

TURBINE ROTOR HEATING, DISASSEMBLY, HANDLING AND REASSEMBLY METHOD AND APPARATUS

This is a division of application Ser. No. 491,509, filed on May 4, 1983, now U.S. Pat. No. 4,567,649, issued Feb. 4, 1986.

BACKGROUND OF THE INVENTION

The present invention relates to handling apparatus and, more particularly, to handling apparatus for disassembly and reassembly of a turbine rotor.

The rotor of a large steam turbine is assembled by installing wheels having turbine buckets extending therefrom on a precisely machined shaft. In order to firmly connect the wheels to the shaft, it is customary to employ a shrink-fit of an axial hole in the wheel onto a mating surface on the shaft. In manufacturing, a shrink-fit is accomplished by heating each wheel to an elevated temperature, thereby expanding the wheel including the axial hole, and then fitting the wheel over the shaft. As the wheel and shaft approach the same temperature, the hole shrinks into a tight fit onto the mating surface of the shaft. The connection between the shaft and the wheel may be further improved using one or more keys. In a multi-stage rotor, the above shrink-fitting process is repeated for installation of each wheel on the shaft. The shaft and previously assembled wheels are maintained at a substantially lower temperature than the wheel being installed. The lower temperature may be room temperature, for example, or in some assembly procedures, a cooling fluid may be circulated through a cavity in the shaft to cool the shaft below room temperature.

An assembled turbine rotor such as, for example, the intermediate pressure or low pressure rotor of a large steam turbine may weigh on the order of hundreds of tons and a wheel may weigh on the order of twenty tons. Handling such massive materials and assembly of them with the precision required for successful operation as a rapidly rotating part of a steam turbine is a major problem. In a factory environment, the rotor is assembled with the shaft in the vertical position and each wheel is raised above the end of the shaft and lowered into position. The lowering and fitting process is critical since the clearances are on the order of just a few thousandths of an inch and the fitting surfaces are precisely machined and may be easily damaged. Deliberate speed is also necessary since, when heating of the wheel is stopped to begin assembly, it begins to cool and the clearance begins to disappear. At normal room temperature cooling rates, the clearance can disappear at the rate of about one thousandth per minute. A further complication is that heavy lift cranes capable of handling massive equipment move relatively slowly. The assembly of a turbine rotor becomes a race with time.

After a turbine rotor has been placed in service, it is routinely inspected by non-destructive testing tehniques. It is not unknown to find flaws in turbine rotors which require the disassembly of such turbine rotors for machining or replacement. Conventionally, disassembly of turbine rotors has been done in the same vertical position as assembly. During disassembly the wheel to be removed has conventionally been heated as rapidly as possible by a ring of gas flames administered simultaneously to both sides of the wheel while injecting as little heat possible into the shaft. Several problems exist in this type of heating. Gas heating is relatively ineffi- cient in terms of the heat entering the material of the wheel. In addition, there are many environments in which the large quantity of products of combustion produced by gas heating a wheel are undesirable. Furthermore, when the magnitude of the shrink-fit is relatively high, heat must be injected into the material at a rate which is very close to the rate which can produce metallurgical changes in the wheel and/or reach or exceed the stress limits of the material of the wheel. With gas heating it is very difficult to control the surface temperature from point to point on the wheel and certain regions may become excessively hot. For example, thin sections which provide relatively long heat conduction paths into the body material of the wheel may become overheated and damaged while thicker sections are properly heated. In addition, large quantities of a flammable gas are unwelcome in many industrial environments.

Reasons exist which make it undesirable to return some turbine rotors to the manufacturing facility for disassembly and repair. Performing the disassembly, repair and reassembly at the using site raises all of the problems described for the manufacturing facility as well as additional difficulties.

Floor space and head room in a power plant tend to be scarce commodities especially while a steam turbine is in the process of being disassembled for maintenance. Such maintenance may take place while other companion servicing operations are being performed which consume floor space. When a power plant is built, a management economic decision very often restricts headroom above a working floor to less than that required to unstack or disassemble a turbine rotor in the vertical position. That is, a turbine rotor may be approximately 35 to 40 feet in length and a head room of approximately one and one-half times this value is required to accommodate lifting slings and clearance of the end of the shaft especially for turbine wheels which are further from the end.

In addition, upending a rotor requires the availability of one or more cranes capable of raising a load on the order of hundreds of tons to a height of approximately one and one half times the rotor length. Management economic decisions during the design of a power plant facility may limit the capacity of available cranes to less than the amount required. Even when such cranes are available, the job progresses slowly since the turbine rotor must be lifted and turned as many as twenty times during the process with each lift taking as much as eight or ten hours for rigging, lifting, turning and lowering.

From an economic standpoint, time is of the essence in returning a large steam turbine to operation since the owning facility must ordinarily replace its economic value with purchased energy. In the case of a large steam turbine driving an electric generator, the purchase of electricity from other suppliers to replace the electricity lost by non-operation during a generator outage may cost on the order of $200,000.00 per day. In the ideal, turbine rotor maintenance should be performed in the shadow of a required schedule for other maintenance in the facility so that the outage enforced by the other maintenance is not prolonged. This establishes an overall time requirement on the rebuilding activity, only part of which is the rotor unstacking and reassembly.

The insufficiency of head room and crane capacity in a using facility may make rotor unstacking and reassembly in a horizontal position an attractive option. However, significant problems are encountered in horizontal handling which have prevented this option from being exercised in large equipment. One of the problems arising during disassembly in the horizontal position results from the tendency of heat to rise. When an attempt is made to heat a wheel while its axis is horizontal, the upper half of the wheel tends to receive more heat then the lower half. Thus, the metal in the upper half may be driven close to its metallurgical and stress limits while the lower half may be insufficiently heated. Further, the weight of a wheel cannot merely be supported on the shaft while it is drawn off since this would damage precisely machined mating surfaces. Since a wheel may have to be moved two feet or more before it is freed from its own mating surface and may thereafter require moving for several more feet before it is clear of the shaft, external support of such a wheel requires a precision which is not commonly found.

Finally, once the wheel is freed from a shaft which is in the horizontal position, the wheel must be rotated or upended from its vertical position to a horizontal position in order to enable handling by conventional cranes and slings.

During reassembly in the horizontal shaft position, the problems of supporting and moving the wheel remain and, in addition, a problem of shaft bending due to differential thermal transfer from the wheel to the shaft may lock an unacceptable kink in the shaft when shrink-fitting is completed.

As previously noted, time is of the essence in rebuilding or servicing a turbine rotor. Thus, each operation which can be facilitated or simplified adds to the value of an apparatus or method for doing so.

OBJECTS AND SUMMARY OF THE INVENTION

Accordingly, it is an object of the invention to provide a turbine rotor disassembly, handling and reassembly apparatus which overcomes the drawbacks of the prior art.

It is a further object of the invention to provide means for unstacking and reassembling a turbine rotor while the shaft is in a horizontal position.

It is a further object of the invention to provide means for closely controlling heat input to a wheel of a turbine rotor in order to differentially expand the opening in the wheel at a rate which is sufficiently faster than the expansion of the shaft onto which it is shrunk that disassembly is possible without damage to the mating surfaces.

It is a further object of the invention to provide an oven and a control system therefore for rapidly heating the wheel of a turbine rotor in a controlled manner to permit the disassembly thereof from a shrunk fit on a shaft.

It is a further object of the invention to provide means for supporting a turbine wheel while it is being removed from a horizontally disposed shaft.

It is a further object of the invention to provide a simplified means for shrink-fitting a turbine rotor wheel onto a shaft.

According to an embodiment of the invention, there is provided a system for handling a turbine rotor of the type having a shaft and at least one turbine wheel shrunk fit on the shaft, comprising an oven fittable over the wheel, means for controlling the oven effective to heat the wheel at a heating rate sufficient to produce an average temperature in the wheel sufficiently higher than an average temperature in the shaft that a shrink-fit between the wheel and the shaft is released by a clearance established therebetween, means for supporting substantially all of a weight of the wheel independently of the shaft with axes of the shaft and the wheel substantially horizontal, and means for horizontally displacing the means for supporting and the wheel along the shaft at least until the wheel is free of a shrink-fit area on the shaft.

According to a feature of the invention, there is provided a handling apparatus for transporting a turbine wheel along a shaft of a turbine rotor with the shaft disposed with its axis horizontal, comprising a handling spool adapted for encircling the shaft outward of the turbine wheel, means for attaching a first end of the handling spool to the turbine wheel, guiding means at a second end of the handling spool for guidingly contacting a peripheral surface of the shaft and effective to provide support for the second end, means for supporting substantially an entire weight of the wheel independently of the shaft, and means for moving the handling apparatus parallel to the axis of the shaft.

According to a further feature of the invention, there is provided apparatus for radially centering a wheel in a clearance on a shaft comprising indicating means affixed to one of the wheel and the shaft for indicating a displacement along at least one axis of the other thereof, means for radially displacing the wheel along the at least one axis with respect to the shaft from a first tangential contact at which the indicating means provides a first indication to a second tangential contact angularly spaced apart 180 degrees from the first tangential at which the indicating means provides a second indication contact, said means for radially displacing including means for radially displacing the wheel to a radial position intermediate the first and second radial positions wherein the indicating means provides a third indication intermediate the first and second indications.

According to a still further feature of the invention, there is provided a method for radially centering a wheel on a shaft along at least one radial axis comprising the steps of radially displacing the wheel along the radial axis to a first position of contact between the wheel and the shaft, radially displacing the wheel along the radial axis to a second position of contact between the wheel and the shaft, the second position being angularly spaced 180 degrees from the first position, and radially displacing the wheel along the radial axis to a third position substantially midway between the first and second positions whereby the wheel is radially centered on the shaft along the radial axis.

According to a still further feature of the invention, there is provided apparatus for heating an object comprising an oven adapted for enclosing at least a substantial part of the object, a plurality of heating means disposed within a heating influence of the object, at least one of the heating means being a principal heating source for a surface zone on the object, means for measuring a temperature of the surface zone effective for producing a temperature signal in response thereto, and control means responsive to the temperature signal for controlling at least one of the heating means in a program effective to maximize a heat input to the object without producing chemical change or stress damage in the object.

According to a still further feature of the invention, there is provided a method for equalizing heating of a shaft during shrink-on of a heated wheel upon the shaft comprising cyclically displacing the wheel along at least a first radial axis of the shaft between a first position of contact therebetween and a second position of contact therebetween, the first and second positions being angularly displaced 180 degrees apart, and cyclically maintaining contact in the first and second positions for relative times effective to equalize the heating of the shaft at least at the first and second positions.

According to a still further feature of the invention, there is provided apparatus for equalizing heating of a shaft during shrink-on of a heated wheel upon the shaft comprising means for cyclically displacing the wheel along at least a first radial axis of the shaft between a first position of contact therebetween and a second position of contact therebetween, the first and second positions being angularly displaced 180 degrees apart, and means for cyclically maintaining contact in the first and second positions for relative times effective to equalize the heating of the shaft at least at the first and second positions.

According to a still further feature of the invention, there is provided an electric oven for heating a turbine wheel on a shaft comprising a first section having a first dimension exceeding a diameter of the turbine wheel, a first circular opening centered in the first section effective for permitting passage of the shaft therethrough, a first plurality of electric heating elements on a first surface of the first section facing a first surface of the turbine wheel, second and third sections fittable together to form a fourth section having a second dimension substantially equal to the first dimension, first and second semicircular notches in the second and third sections respectively effective to form a second circular opening in the fourth section effective for permitting passage of at least the shaft therethrough, a second plurality of electric heating elements on a second surface of the fourth section facing a second surface of the turbine wheel, and an annular wall affixed to one of the first section and the fourth section effective for bridging a gap between the first and fourth sections to form a substantially closed oven about the turbine wheel.

According to yet another feature of the invention, there is provided a method for equalizing heating of a shaft during shrink-fitting of a wheel thereon, wherein the wheel is prepared by being heated to a temperature substantially higher than a temperature of the shaft whereby an axial hole in the wheel is expanded to a diameter greater than a mating diameter on the shaft comprising the steps of radially displacing the wheel along the radial axis to a first position of contact between the wheel and the shaft, determining the first position, radially displacing the wheel along the radial axis to a second position of contact between the wheel and the shaft, the second position being angularly spaced 180 degrees from the first position, determining the second position, radially displacing the wheel along the radial axis to a third position substantially midway between the first and second positions whereby the wheel is radially centered in the clearance on the shaft out of contact with the shaft, and maintaining the wheel in the third position while the wheel cools and a shrink-fit is established.

Briefly stated, in accordance with one embodiment of the invention, there is provided an electric oven for surrounding one wheel of a turbine rotor having zone controlled heating elements which are programmed to inject a maximum permissible amount of heat into the wheel without exceeding metallurgical or stress limits.

In addition, a handling apparatus radially supports the wheel using a soft hydraulic system and allows removal of the wheel in a horizontal direction with the axes of both the rotor shaft and the wheel aligned in the horizontal direction. The handling apparatus uses a handling spool having soft shoes at one of its ends which make soft sliding contact with the shaft and is affixed to the wheel at the other of its ends. The soft hydraulic system also rotates the wheel through a small arc about its point of contact with the shaft. A clearance sensing system is provided to guide the operation of the soft hydraulic system for positioning the expanded wheel in the center of its clearance about the shaft. An upender, built as an integral part of the handling apparatus, rotates the spool and the attached wheel about a horizontal axis once the wheel is free of the shaft so that the wheel can be hoisted away using conventional handling apparatus. An oscillating or orbiting motion of the wheel with respect to the shaft may be employed during reassembly to eliminate the necessity for rotating the shaft and wheel while the clearance therebetween shrinks and disappears. The oscillation or orbiting transfers heat uniformly from the heated wheel to the cooler shaft to prevent unequal expansion of the shaft and a resulting shaft kink which may be locked in when the shrink-fit is completed.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 1 is an axial cross section of the upper half of one end of a two-flow intermediate pressure steam turbine rotor.

FIG. 2 is a perspective view of an electric oven according to an embodiment of the invention.

FIG. 3 is a side view of a portion of a turbine rotor with a handling apparatus according to the present invention in place in preparation for removing one or more of the turbine wheels.

FIG. 4 is an enlarged view of part 154 as shown in FIG. 3.

FIG. 5 is a plan view of part 154 shown in FIG. 4.

FIG. 6 is a cross section taken along section VI—VI of FIG. 3.

FIG. 7 is a simplified schematic and block diagram of an electrical control system for zone controlling the heating of a wheel according to the present invention.

FIG. 13 is a side view of the handling apparatus of FIG. 3 showing upending of a turbine wheel.

FIG. 14 is a simplified axial cross section through a shaft and wheel illustrating shaft bending due to unequal thermal expansion.

FIG. 15 is a transverse cross section of a shaft and wheel showing linear motion of the wheel to equalize shaft expansion.

FIG. 16 is a transverse cross section of a shaft and wheel illustrating orbiting motion of a wheel about the shaft to equalize heating of the shaft.

FIG. 17 is a transversed cross section of a shaft and wheel illustrating the shaft in the centered position.

DETAILED DESCRIPTION OF A PREFERRED EMBODIMENT

Figure 8:
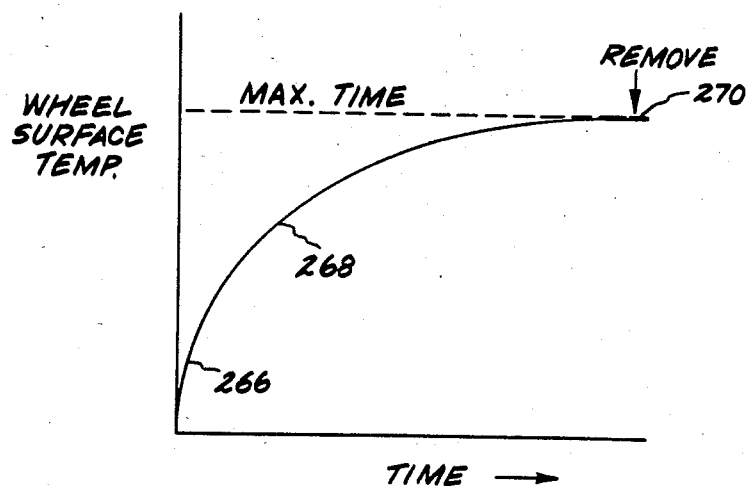
FIG. 8 is a curve to which reference will be made in describing the heating program according to the present invention.

Referring now to FIG. 1, there is shown the upper half of a left half of a two-flow intermediate pressure steam turbine rotor 10. A shaft 12, the upper left half of which is shown, supports eight turbine stages 14, 16, 18, 20, 22, 24, 26 and 28 and a bolted coupling 30, all of which are shrunk onto shaft 12 and may be additionally secured by using interlocking means such as, for example, keys (not shown). The right end of rotor 10 (not shown) is the mirror image of that shown in FIG. 1 and, in operation, steam is admitted in the center, separates and flows in opposite directions as indicated by steam flow arrows 32.

It will be noted that the diameter of shaft 12 is stepped, being greatest at a maximum diameter indicated by 34 and stepping down to smaller diameters 35, 36, 37, 38, 39, 40, and 41 and finally stepping down to a minimum diameter 42. Bolted coupling 30 is shrunk onto minimum diameter 42. A wheel 44 is shrunk onto diameter 41 which is slightly greater than minimum diameter 42. Wheels 46, 48, 50, 52, 54 and 56 of turbine stages 16, 18, 20, 22, 24 and 26 are respectively shrunk onto the successively larger diameters 40 through 35. Finally, wheel 58 of turbine stage 28 is shrunk onto maximum diameter 34. Wheels 44–58 are preferably spaced a short distance such as, for example, about 0.04 inches, apart.

In order to disassemble, or unstack, rotor 10 bolted coupling 30 is removed by means not of concern here and then each of wheels 44–58 is expanded in turn by heating at a heating rate sufficiently higher than the heating rate of a corresponding portion of shaft 12 so that the shrunk-on engagement at the coupling surface is released. Then, once a clearance has been developed between the wheel and the corresponding shaft diameter, the wheel is moved to the left in FIG. 1 until it passes over the next smaller diameter which may be an inch or more smaller. At this point, the wheel is essentially freed for removal from shaft 12. The heating and removal process is repeated until all of the wheels are removed.

There are five basic problem areas addressed by the present invention:
1. Heating
2. Supporting
3. Pulling
4. Upending
5. Reassembling In order to avoid the problems of heating turbine wheels with gas and to maintain more precise control over the heating process, a three-part electric oven shown in FIG. 2 generally at 60 is employed. Electric oven 60 includes first and second 180-degree sections 62 and 64 which may be fitted together using conventional latch-type fasteners (not shown) to form a 360-degree dish-type assembly. The general shape of the final dish type assembly may be of any convenient type such as, for example, round, square or other regular polyhedron. For manufacturing convenience, sections 62 and 64 are shaped so that the dish-type assembly formed by them assumes an eight-sided, or octagonal, figure. Sections 62 and 64 each include a wall 66 forming a mirror half of an octagonal figure bounded by a surrounding lip 68. Wall 66 and lip 68 are formed of a metal outer skin 70 lined inside with a suitable high temperature insulating layer 72 which is, in turn, covered with a metal inner skin 73. Outer skin 70 and inner skin 73 may be of any convenient material such as, for example, high temperature stainless steel. In the preferred embodiment, insulating layer 72 is a layer of Kaolin wool. Lifting eyes 74 and 76 are affixed at approximately the balance points of sections 62 and 64 to enable attachment of lifting hooks for handling sections 62 and 64. Semicircular notches 80 and 82 form a circular opening when sections 62 and 64 are mated so as to be fittable over the hubs of wheels or over shaft 12. Heater regions 84 and 86 form semicircular regions spaced outward from semicircular notches 80 and 82. When sections 62 and 64 are mated, heater regions 84 and 86 form a substantially complete circle positioned relatively close to semicircular notches 80 and 82 for injecting heat into the rotor wheel.

The exact form and type of electric heater employed in heater regions 84 and 86 is not important to the present invention and therefore these elements are not shown in detail. In the preferred embodiment, any convenient type of electric heater is employed including open resistance wires, open resistance wires wound in coils on ceramic rods or covered heater wires such as, for example, CALROD heater elements. CALROD is a trademark of the General Electric Company for electrical resistance heating elements of the sheathed tubular type. In the most preferred embodiment, open heater wires wound on ceramic rods are employed. Heater regions 84 and 86 are divided into separately controllable zones 88 as indicated by the dividing lines in heater regions 84 and 86. The separately controllable zones 88 are controlled in a manner to be described to precisely program the injection of heat into the turbine wheel without risking damage to the wheel or unnecessarily shortened life for the heater elements. Although any number of zones 88 may be employed, six zones in each of sections 62 and 64 are shown. In the preferred embodiment, a total of twenty four zones is employed for precise control.

An octagonal section 90 of oven 60 is shown with its inside surface rotated to face outward for descriptive purposes. Octagonal section 90 includes a metallic disc 92 having a circular opening 94 in its center. An insulating layer 96 which may be, for example, a four inch layer of Kaolin wool and an inner metal skin 93 covers the surface of disc 92 except for a clamping area 98 surrounding circular opening 94 which is employed, as will be described, for affixing octagonal section 90 in place for use. A plurality of clamp openings 100, 102 and 104 are provided as part of the attachment system as will be explained.

If octagonal section 90 were formed of a single flat metallic sheet, it would tend to buckle during heating. In order to overcome this problem, octagonal section 90 is formed of a plurality of overlapping plates (not shown) with slip joints at their abutments. Other obvious techniques would occur to one skilled in the art for forming octagonal section 90 in a fashion to resist deformation during heating or handling.

A heater region 106, which may have any convenient shape such as, for example, circular, surrounds clamping area 98. Heater region 106 is preferably divided into independently controllable zones 108. Heater region 106 is shown divided into twelve zones, corresponding to the twelve zones in sections 62 and 64. Although it may be convenient to have the same number of zones 108 as there are zones 88, this is not a requirement since independent control of heater region 106 may require a different zoning arrangement from the zoning arrangement in heater regions 84 and 86. Octagonal section 90 is sized to fit and substantially seal the face of sections 62 and 64 when these sections are joined together in a dish-shaped assembly. Conventional quick acting fasteners (not shown) may be employed to attach or clamp sections 62 and 64 to octagonal section 90.

It would be clear that lip 68 could be made part of octagonal section 90 without departing from the scope of the invention. For added stiffness to octagonal section 90, a rim 109 may be included on its perimeter. Rim 109 may either abut or interfit with lip 68 of sections 62 and 64.

Although the embodiment of FIG. 2 illustrates zones represented by sectors separated by radii of oven 60, it would be cleared to one skilled in the art that concentric zones could also be created in the radial direction so that independent control of zones closer to the axis and further away from the axis can be achieved.

Referring now to FIG. 3, a handling apparatus is shown generally at 110. Handling apparatus 110 optionally includes a platform 112 which may also include one or more guide rails 114 on an upper surface 116. In a using facility, platform 112 may usefully be installed as part of handling apparatus 110 to provide a more precise surface 116 for the handling of rotor discs and other elements than is provided by the original floor in the using facility.

A handling trolley 118 is supported on surface 116 on a plurality of wheels 120. One or more sets of wheels 120 may have V-grooves for interfacing with guide rail 114 or, alternatively, all of wheels 120 may be ungrooved and guide rail 114 may include one or more pairs of guide rails (not shown) straddling one or more of wheels 120. The interaction of wheels 120 and guide rail 114 provides linear motion of handling apparatus 110 along a Z axis indicated by a double headed arrow 122 aligned with the axis of shaft 12. In the preferred embodiment, wheels 120 each includes a V-groove (not shown) in its peripheral surface and guide rail 114 is a V-shaped rail with the vertex of the V directed upward for engagement with the V-groove.

The weight of rotor 10 is supported on a support 124 which may include, for example, a built-in hydraulic jack which may be lowered to permit moving support 124 under a flange region 126 between any adjacent pair of wheels spaced from the wheel being pulled and then raised to support the weight of rotor 10. Alternatively, a second jack (not shown) may be used to raise rotor 10 while support 124 is moved into position under it and then to lower rotor 10 onto support 124 as shown. Support 124 includes a relatively broad stable base 128 supported on surface 116 and an upper end 130 capable of supporting flange region 126. Upper end 130 may include, for example, a V-shaped depression therein. An opposite end of rotor 10 (not shown) may be similarly supported on a support 124. Additional supports (not shown) may be required so that support 124 may be maneuvered from its operating position shown into a new operating position in preparation for removing the next wheel. In the preferred embodiment, base 128 may have a conventional air support system for permitting free motion along surface 116 while unloaded.

Handling apparatus 110 includes a support structure 132 mounted on handling trolley 118. Support structure 132 is symmetrically duplicated on each side of handling trolley 118. Only one side of support structure 132 is shown since the identical structure on the opposite side is hidden by the elements shown in FIG. 3.

A load-bearing leg 134 is rigidly affixed at its lower end to handling trolley 118. The upper end of load-bearing leg 134 is attached to a ball joint 135. Ball joint 125 is attached to a piston rod 136 of a piston 137.

A handling spool 138 encircling shaft 12 is supported by load-bearing leg 134 with its axis horizontally disposed. A clamping plate 140 at a forward end of handling spool 138 abuts an outside of clamping area 98 of octagonal section 90. Clamping area 98 is preferably affixed to clamping plate 140 by suitable means such as screws or bolts. An adapter ring 142, affixed to clamping plate 140 passes through circular opening 94 into abutment with a hub 144 of wheel 44. Different adapter rings 142 and hub support keys 106 may be employed as necessary to handle the different sizes of wheels on rotor 10 with the remainder of the apparatus remaining substantially unchanged.

Three shoe-support bars 145 are equally spaced 120 degrees apart extending from the rear surface of clamping plate 140 and surrounding shaft 12. A secondary plate 146 is spaced from clamping plate 140.

Shoe-support bars 145 pass through and are welded to secondary plate 146. A plurality of wheel hooks 147 engage a groove 148 behind hub 144. Wheel hooks 147 are tightened by rods 150 passing through clamp openings 100, 102 and 104 and aligned holes in clamping plate 140 and secondary plate 146 using conventional means such as, for example, nuts 151 to draw hub 144 into tight engagement with adapter ring 142. Clamping plate 140 may include appropriate locating keys 106, or alternatively, clamps, shims, bosses, flanges or the like (not shown) which extend through openings 97, 99, 101, 103 and 105 in oven section 90 (FIG. 2) for accurately centering it on hub 144.

It will noted that the other wheels do not include a counterpart of a groove 148 behind hub 144. In order to handle wheels not so equipped such as, for example, wheels 46 and 48, clamping plate 140 and secondary plate 146 may include additional holes suitably spaced so that bolts (not shown) may be inserted through steam or other holes 152 to thereby affix the respective wheel to handling spool 138. Since one skilled in the art would immediately recognize the techniques for attaching subsequent wheels to an adapter ring employing holes 152, further description of a precise structure for doing so is omitted.

An adjustable soft bearing assembly 154 disposed on each of shoe-support bars 145 provide stabilizing support for handling spool 138 and the attached wheel such as, for example, wheel 44. Referring now to FIGS. 4 and 5, adjustable soft bearing assembly 154 is shown in greater detail. Shoe-support bar 145 includes a first surface 155 facing shaft 12 and a second surface 156 parallel to first surface 155 facing away from shaft 12. A guide plate 157 is rigidly affixed to shoe-support bar 145 using, for example, a plurality of bolts 158 which may be threaded into holes 159 in shoe-support bar 145. As shown in FIG. 4, a plurality of additional appropriately spaced holes 159 are provided along shoe-support bar 145 so that the axial position of soft bearing assembly 154 can be changed as desired to accommodate different sizes of wheels and/or different relationships of shaft diameter steps.

A row of bolts 160 through guide plate 157 rigidly affix a spacer 161 against surface 155 with an outer surface 162 thereof parallel to surface 155. Similarly, a row of bolts 163 through guide plate 157 rigidly affix a spacer 164 against surface 156 with an outer surface 165 thereof parallel to surfaces 156 and 155. A similar guide plate and spacers are disposed on the opposite side of shoe-support bar 145 but are hidden from view by other elements in FIGS. 4 and 5. Spacers 161 and 164 are preferably selected so that the sum of their thicknesses is a fixed predetermined value. That is, the distance between outer surfaces 162 and 165 is preferably a constant. It will be noted, for example, that spacer 164 has a greater thickness than spacer 161. If spacers 164 and 161 are interchanged, the distance between outer surfaces 162 and 165 remains unchanged but they are displaced inward toward shaft 12. This permits one basic soft bearing assembly 154 to function over a wide range of shaft diameters as will be explained.

In the following description, when corresponding elements on opposite sides of shoe assembly 168 are visible in FIG. 5, they are given the same reference designator assigned to the side visible in FIG. 4 except they are primed. Guide plate 157 includes parallel guide surfaces 166 and 167 on its opposed edges. A shoe assembly 168 includes parallel guide rails 169 and 170 straddling guide plate 157. Guide rails 169 and 170 include parallel surfaces 171 and 172 respectively bearing slideably on guide surfaces 166 and 167 to permit motion of shoe assembly as indicated by a double-headed arrow 153. Plates 173 and 174 bridge between guide rails 169 and 170 and are rigidly affixed thereto using, for example, bolts 175. A spacer bar 176 (see FIG. 5), having approximately the same thickness as shoe-support bar 145 is disposed between guide rails 169 and 169' and guide rails 170 and 170'. Two shoe blocks 177 and 177' of a strong, relatively soft non-scratching material which can bear against a machined surface and slide thereon without scratching or otherwise damaging the machined surface are held in the rectangular openings formed by guide rails 169, 169', 170 and 170', plates 173 and 173' and spacer bar 176. Shoe blocks 177 and 177' extend a short distance beyond the remainder of shoe assembly 168 to bear against the peripheral surface of shaft 12. The bearing surfaces of shoe blocks 177 and 177' are preferably bevelled or otherwise shaped to increase the contact area with the surface of shaft 12.

One suitable material for shoe blocks 177 and 177' is a cloth and resin composition known by the trademark Textolite. Other suitable materials having the recited properties such as, for example, blocks of a suitable wood may also be used.

An inner surface 178 of spacer bar 176, shown dashed in FIG. 4 is angled or inclined to bear upon an inclined surface 179 of a wedge 180. Another surface 181 of wedge 180 bears slideably upon outer surface 162 of spacer 161. A similar spacer bar 182 is disposed at the opposite end of shoe assembly 168 with an inner surface 183 angled or inclined to bear against an inclined surface 184 of a wedge 185. One skilled in the art will realize that, when one of wedges 180 and 185 is moved in one direction and the other thereof is moved a corresponding distance in the other direction, shoe assembly 168 is moved in a controlled manner toward or away from shaft 12.

A clamp 186 is affixed, preferably by welding, to a tip 187 of wedge 180. A pair of clamping rods 188 and 188' are attached at one end to a block 189 which is affixed to shoe assembly 168 by, for example, bolts 190. Clamping rods 188 and 188' are inclined at an angle generally parallelling inclined surface 179 of wedge 180. Clamping rods 188 and 188' pass through holes (not shown) in clamp 186. The diameter of the holes in clamp 186 can be reduced using bolts 191 and 191' so that an adjustment position of wedge 180 may be maintained.

A similar clamping arrangement is provided for wedge 185 which, since it exactly corresponds to the arrangement for clamping wedge 180 in an adjustment position, is not further described.

The six contact areas (two per shoe assembly) between shoe blocks 177, 177', etc. and shaft 12 represent a fulcrum about which handling spool 138 may be rotated for centering and adjusting the angular position of handling spool 138 during attachment of handling apparatus 110 to a wheel to be removed and during the removal thereof. As the wheel is removed by pulling it outward, shoe blocks 177, 177', etc. slide upon the surface of shaft 12 while an inboard region of handling spool 138 is supported on platform 112 by support structure 132. As will be explained hereinafter, support structure 132 includes a controllable lifting device so that, with the outboard end of handling spool 138 supported on the three soft bearing assemblies 154, the inboard end of handling spool 138, including any load attached thereto such as, for example, wheel 44 and electric oven 60, may be rotated in a limited vertical arc about the points of contact of soft bearing assemblies 154 with shaft 12. In this way a desired vertical position of wheel 44 may be attained. In addition, support structure 132 includes means for limited translation in the horizontal direction so that handling spool 138 may be moved on a limited horizontal arc about soft bearing asseblies 154. Furthermore, combinations of motions of the lifting device, together with adjustment of the adjustment wedges in soft bearing assemblies 154 permits cocking or skewing the axis of handling spool 138 when desired. These provisions for angular and height adjustments of handling spool 138 and the elements attached thereto permit alignment of the axis of handling spool 138 accurately parallel to the axis of shaft 12.

Referring again to FIG. 3, a block 192 affixed to the rear surface of clamping plate 140 supports a pivot plate 193 spaced outward from clamping plate 140. Pivot plate 193 is pivoted on a shaft 194 of a bearing 195 which is, in turn, connected to the upper end of piston 137. Piston 137, supported by load-bearing leg 134 and ball joint 135 comprises part of the lifting device alluded to earlier.

Ball joint 135 rests against the rear surface of clamping plate 140. A retainer plate 196, affixed to the forward surface of secondary plate 146 retains ball joint 135 in this position. One or more gusset plates 197 may be provided to strengthen retainer plate 196. A cross brace 198, whose function will be later described, spans the space between clamping plate 140 and secondary plate 146.

A lower end of an upending hydraulic cylinder 200 is pivoted at a pivot 201 to handling trolley 118. The upper end of a piston rod 202 of upending hydraulic cylinder 200 is connected at a hinge 203 to the outside surface of secondary plate 146.

Referring now to FIG. 6, wherein corresponding elements which were hidden in previous figures are given the same reference designators primed, a shaft 204 serves as a common pivot for both ball joints 135 and 135'. U-shaped shackles 206 and 206' are attached to load-bearing legs 134 and 134' respectively and carry shaft 204 which is affixed by conventional means such as, for example, by pins 205 and 205'.

A pair of jack screws 208 and 208' are threaded through respective cross braces 198 and 198'. Jack screws 208 and 208' can be adjusted to bear against the ends of shaft 204. When jack screws 208 and 208' are adjusted, a substantial transverse freedom of motion is permitted at ball joints 135, 135' and 195, 195' so that handling spool 138 can be moved from side to side along an X axis shown by a double-headed arrow. This motion can be produced, for example, by loosening one of jack screws 208 and 208' and tightening the other. Once the desired transverse position is found for handling spool 138, jack screws 208 and 208' may be tightened against the ends of shaft 204 so that side play is substantially eliminated.

By suitably increasing and decreasing fluid pressure in hydraulic pistions 137 and 137', clamping plate 140, and the elements attached to it, may be moved upward and downward along a Y axis as shown by a double-headed arrow.

It would be clear to one skilled in the art that if pistons 137 and 137' are moved upward and downward together, handling spool 138 is moved upward and downward without rotation about its axis. Alternatively, if pistons 137 and 137' are actuated in different directions, handling spool 138 is rotated about its axis. Such rotation is useful especially during reassembly of a turbine rotor in order to align interfitting members such a keyways on an attached turbine wheel with similar elements on shaft.

Returning now to FIG. 3, a puller 220 of any convenient design may be employed to urge handling spool 138 and the elements attached to it in the leftward direction in FIG. 3 to thereby free an attached wheel such as, for example, wheel 44, from the mating diameter of shaft 12. Puller 220 may use one or more hydraulic elements or, as shown, may employ a screw 222 contacting an end 224 of shaft 12 which may be urged to produce a rightward force by a conventional device such as a nut (not shown) in a driving mechanism 226. Driving mechanism 226 may be adjustably connected to clevises 228 at the outboard ends of shoe-support bars 145 by, for example, rods 230 using, for example, bolts 233 or pins. When screw 222 is urged to produce a rightward force against end 224, rods 230 exert a leftward force on handling spool 138 to thereby move handling spool 138 and wheel 44 in the leftward direction supported on handling trolley 118 which rolls upon surface 116. As soon as the axis of wheel 44 is clear of its mating surface on shaft 12 and is over a smaller diameter portion of shaft 12 so that no further risk of wheel 44 shrinking into attachment on shaft 12 exists, leftward motion of the assembly may be stopped and oven sections 62 and 64 may be removed. In addition, puller 220 may be removed at this time or at a slightly later time as convenient. Once oven sections 62 and 64 and puller 220 are removed, wheel 44 can be moved free of shaft 12 and can be upended as will be described.

Prior to describing the upending process, some additional detail of the procedure for heating, aligning and moving wheel 44 is given. Heaters in heater regions 84, 86 and 106 are called on to inject large quantities of heat into wheel 44, for example, in as short a time as possible. This is accomplished in the present invention by spacing the heaters as close as possible to the wheel, in some cases, as close as one-quarter inch, while being careful to maintain the heaters out of actual contact with the wheel. In this way, radiant heat transfer is the dominant heating mode. Blades such as, for example, blades 232 may be left in place or may be removed prior to heating. If blades 232 are left in place, they are preferably covered by a suitable insulating layer 234 to protect them from the heat since blades 232 include relatively thin sections which have such long heat flowpaths into wheel 44 that they would become overheated during the process of heating wheel 44. Insulating layer 234 may be of any convenient type capable of withstanding the environment within electric oven 60 and capable of providing sufficient insulation. In addition, insulating layer 234 should not shed material which could fall upon the heaters and thereby cause local overheating and failure. In the preferred embodiment, insulating layer 234 includes a layer of Kaolin wool with an outer shield of stainless steel. The stainless steel, besides reflecting radiant heat to reduce the heat inflow, also retains the Kaolin wool in place and prevents it from shedding and damaging the heaters.

In the case of some turbine stages, it may be desirable to remove the blades from the wheel before heating. This may be done in order to reduce the diameter of electric oven 60 or for other purposes. If the rotor blades are removed, insulation of the dovetail region 236 of wheel 44 may be required. Such insulation of a dovetail region may be especially important if the dovetail design includes finger-type dovetails of the type disclosed in U.S. Pat. No. 2,790,620 or if dovetail region 236 contains other thin sections which have such long heat flowpaths into the body of the material of wheel 44 that overheating is likely to occur. As will be explained hereinafter, temperature monitoring of such thin sections where overheating may occur may be performed and an associated nearby heater may be zone controlled to avoid overheating.

In a similar manner, an annular protuberance 238 may be insulated by an insulating layer 240 to prevent overheating and/or monitored during heating.

As an object is heated by heat applied to its exterior, a temperature gradient is set up between its surface and its interior. This temperature gradient causes differential expansion through the material and thereby produces a stress in the material. The stress which the material of which steam turbine wheels are made can withstand is reduced as its temperature is increased. Thus, as the temperature of the material increases, the rate at which heat can be injected without producing stress damage decreases.

In order to provide control over heating rate, a zone control system such as is shown generally at 242 in FIG. 7 may be employed. Zone control system 242 includes individual zone controls such as, for example, zone A control system 243 which includes one or more resistance-type heaters 244 in one of zones 88 (108) of FIG. 2. It should be understood that, although only a single heater 244 is shown, a zone 88 may include a plurality of such heaters generally located in a concentrated area definable as zone A. A temperature sensor 246 which may be, for example, a type K thermocouple, produces a temperature signal proportional to the temperature of heater 244. The temperature signal is applied on a line 248 to a zone A controller 250.

A plurality of temperature sensors 252 and 254 are disposed in thermal contact with the wheel being heated in locations under the heating influence of the associated zone A heater 244. Thus, temperature sensors 252 and 254 which may be, for example, type K thermocouples, produce temperature signals which are proportional to the temperature of the wheel produced in zone A by zone A heater 244. The temperature signals from temperature sensors 252 and 254 are applied to zone A controller 250. Although two temperature sensors 252 and 254 are shown, more or less than two temperature sensors may be employed depending on the expected uniformity of heating in the zone and also on the presence of critical sections such as finger dovetails or thin sections which must be protected from overheating.

Zone A controller 250 produces a control signal in response to its input which is applied on a line 256 to a zone A switch 258. Zone A switch 258 controls the application of primary power from an input 260 to heater 244. Although any type of suitable switch may be employed in zone A switch 258 and may, in turn, be controlled in any modulated fashion for producing the required input to heater 244, in the preferred embodiment, zone A switch 258 employs silicon controlled rectifiers which are controlled by zone A controller 250 to apply a percentage of full cycles of the primary power on input 260 to heater 244 and to cut off the remaining cycles of power. For convenience of description, it may be assumed that zone A controller 250 and zone A switch 258 operate on the primary power in increments of 100 cycles. If the inputs to zone A controller 250 require, for example, sixty percent of power input to heater 244, zone A controller 250 may apply a signal to zone A switch 258 which applies 60 of the 100 cycles to heater 244 and cuts off or blocks the remaining 40 cycles in the 100-cycle series. This procedure is continued in 100-cycle blocks with the percentage increasing and decreasing according to the sensed inputs to zone A controller 250. Thus, the temperature of the wheel in zone A is controlled according to a predetermined program as will be described.

In the preferred embodiment, heater 244 is a nichrome wire wound on a plurality of ceramic rods supported inside the electric oven. If such heater elements are permitted to operate at their maximum temperatures, they have a relatively short life. In order to extend the lives of the heater elements, temperature sensor 246 is thermally coupled to heater 244 to monitor the temperature of the nichrome wire. Zone A controller 250 therefore responds not only to the temperature attained by the wheel being heated, as sensed by temperature sensors 252 and 254, but also overrides the temperature control of the wheel if temperature sensor 246 determines that the temperature of heater 244 exceeds a predetermined value.

Control systems for the remaining zones such as, for example, zone B control system 262 and zone N control system 264 are the same as zone A control system 243 and will therefore not be further detailed.

Zone A controller 250 performs the principal function of programming the surface temperature of the wheel being heated to obtain the maximum permissible heating rate within metallurgical and stress limits. Zone A controller 250 may be of any convenient type including an analog computer or a digital computer of discrete components or integrated circuits, a microprocessor, minicomputer or a main frame computer. In the preferred embodiment, zone A controller 250 is a portion of a microprocessor with the remainder of the microprocessor servicing similar functions in the remainder of zones 262-264. Any convenient microprocessor may be employed such as a Coopermaster microprocessor produced by Cooperheat Co. in Rahway, N.J.

Referring now to FIG. 8, there is shown a curve representing one possible heating program which may be enforced by zone A controller 250. The heating program shown injects the maximum amount of heat into the wheel in a minimum amount of time without exceeding the limiting parameters. Beginning at a wheel surface temperature equal to about a room temperature of 75 degrees F, for example, a first heating period 266 applies heat to the wheel as rapidly as possible within the limits of the capability of the heaters.

The rate of surface temperature increase must be reduced in order to avoid stress damage to the wheel in a second heating period 268. This surface heating rate may depend on the particular structure of the wheel and also the location of the sensor. Near the end of the heating period, the surface temperature rate is further limited until at an end 270 of the heating period, the surface of the wheel finally reaches the maximum permissible temperature. At this time, the required clearance has developed and removal of the wheel may begin.

It will be recognized that the actual rates and final temperature limits depend on the wheel design, its material and the amount of shrink which must be overcome in order to remove the wheel.

One skilled in the art would recognize that implementation of the heating program in FIG. 8 using a digital control device may conveniently be performed using a piecewise approximation of the smooth curve. However, since piecewise approximations of a smooth curve are per se old in the art, further detail thereof is omitted herefrom. The fact that piecewise approximations may be found in the art should not reduce or limit the scope of the present invention wherein the application of a heating program as disclosed is in itself a non-obvious application of such a process.

Referring now to FIGS. 3 and 6, once wheel 44 is sufficiently heated, its weight must be supported to avoid damaging the machined mating surfaces while wheel 44 is moved far enough leftward to be completely over the next smaller diameter. Support is provided by admitting pressurized fluid into pistons 137 and 137' until an upward force is produced which is just sufficient to support wheel 44 with its axial bore concentric with shaft 12.

Figure 9:
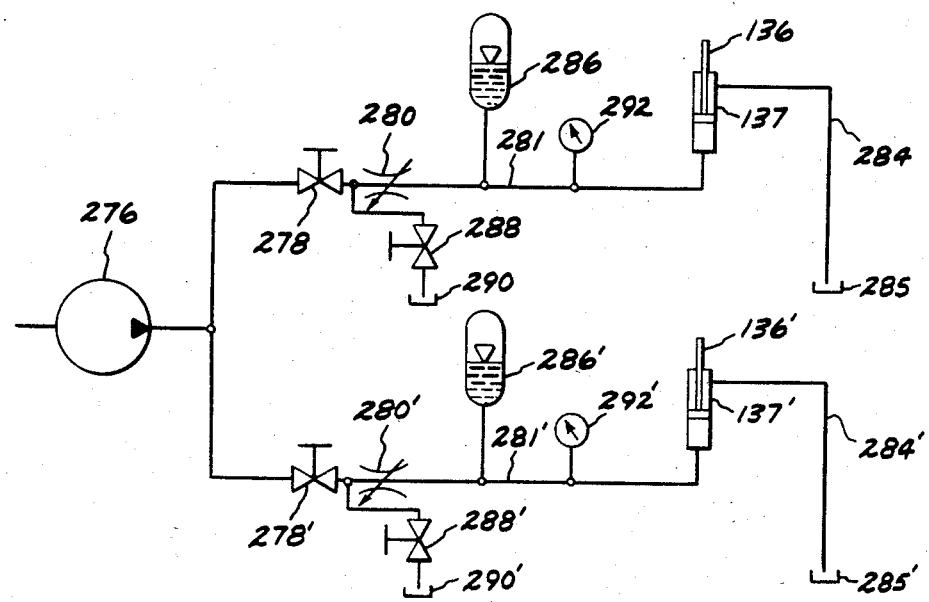
FIG. 9 is a simplified schematic hydraulic diagram of the soft hydraulic system of the present invention.

Referring now to FIG. 9 there is shown a hydraulic system which is suitable for controlling fluid pressure to pistons 137 and 137' for support in the manner described. A source of fluid pressure such as, for example, a fluid pump 276 provides pressurized fluid to a pair of identical branches, one feeding piston 137 and the other feeding piston 137'. Since they are identical, only the branch feeding piston 137 is described in detail. The other branch is assigned identical but primed reference designators. A control valve 278 receives pressurized fluid from fluid pump 276 and admits through flow control valve 280 a controlled amount through a flow control valve 278 to a line 281. Line 281 feeds pressurized fluid to an accumulator 286 and to the admission of pressurized fluid to piston 137. A drain valve 288 is operative to release fluid from line 281 into a sump 290. Line 284 bleeds leakage fluid from piston 137 into a sump 285. A pressure gauge 292 is optionally provided to indicate the pressure in line 281.

The inclusion of hydraulic accumulator 286 in the hydraulic system creates a soft hydraulic system which is capable of permitting some motion of piston rods 136 and 136' without substantially changing the supporting force applied. Thus, when the desired fluid pressure is admitted through control valve 278 and control valve 278 is closed, the soft hydraulic system to the right of control valve 278 continues to apply substantially the same force to support the wheel and attached elements even when pistonrods 136 and 136' are moved upward or downward slightly due to such causes as, for example, shaft bow or other sources of misalignment. The full weight of the wheel is supported in a hydraulically soft manner. Even if misalignment is encountered while drawing the wheel from its mating surface, contact between the wheel and the shaft is very light and unlikely to cause damage.

Figure 10:
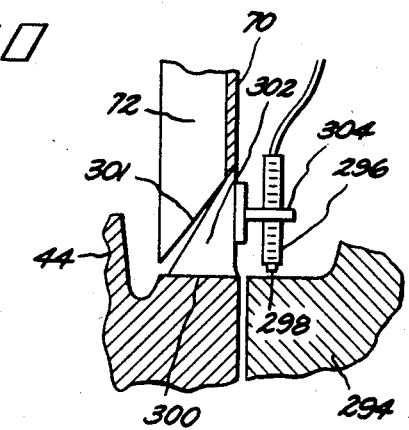
FIG. 10 is a cross sectional view of a portion of two adjacent turbine wheels showing the mounting of a proximity sensor for detecting clearance between one of the wheels and the shaft.

It will be recognized that some means must be provided for determining when the appropriate pressure exists in pistons 137 and 137' to just support the weight on them. Referring now to FIG. 10, one way of determining the required fluid pressure is shown. For this description, it is assumed that wheel 44 is being removed. Since adjacent wheel 46 is still in shrink-fit contact with shaft 12, any convenient point on wheel 46 may be employed as a reference surface having a fixed relationship with shaft 12 for referring vertical displacement of wheel 44. For example, an uppermost point on a flange 294 of wheel 46 adjacent to wheel 44 may be employed as a reference surface. A proximity sensor 296 is positioned with its sensing coil 298 close to, but not touching, flange 294. Proximity sensor 296 is affixed to a flange 300 on wheel 44. The heat in this vicinity is such that proximity sensor 296 can not be affixed too early for fear of its destruction. A rapid method of attachment is desirable. Such a rapid method of attachment is provided, for example, by a permanent magnet 302 which is fitted through a small opening 301 provided for that purpose in outer skin 70 to support a bar 304 cantilevered over flange 294 supporting proximity sensor 296. Bar 304 may be threaded, if necessary, to permit threadable adjustment between itself and proximity sensor 296, for adjustment of the spacing between sensing coil 298 and flange 294.

Figure 11:
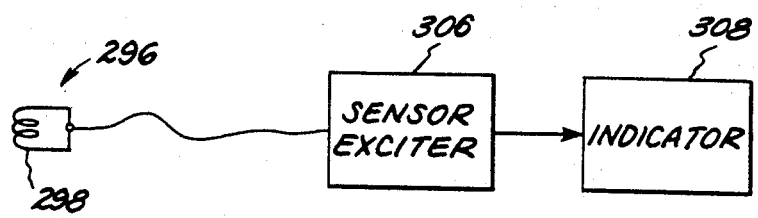
FIG. 11 is a simplified block diagram of a proximity sensor and indicator.

When wheel 44 is sufficiently heated to provide clearance between itself and shaft 12, this clearance may be sensed by appropriate sensors or by raising wheel 44 employing the hydraulic system previously described and measuring the distance through which wheel 44 travels by the change in distance between sensing coil 298 and flange 294. One way that this distance may be sensed is shown in FIG. 11 wherein sensing coil 298 is excited by a conventional sensor exciter 306. Conventionally, sensor exciter 306 produces an alternating signal which, when applied to a sensing coil 298 in the vicinity of a ferromagnetic material, produces a characteristic which is variable in dependence on the distance between sensing coil 298 and the surface being sensed and which can be received by sensor exciter 306. The characteristic may be a voltage, a current, an impedance or other electrical property and the output of sensor exciter 306 in response thereto may be a DC or an AC signal which is applied to a conventional indicator 308.

Indicator 308 may be a digital or analog meter or other conventional device, however, in the preferred embodiment, indicator 308 is an oscilloscope which is especially useful because of the visualization it gives the operator of the position of the wheel being removed with respect to the shaft.

Figure 12:
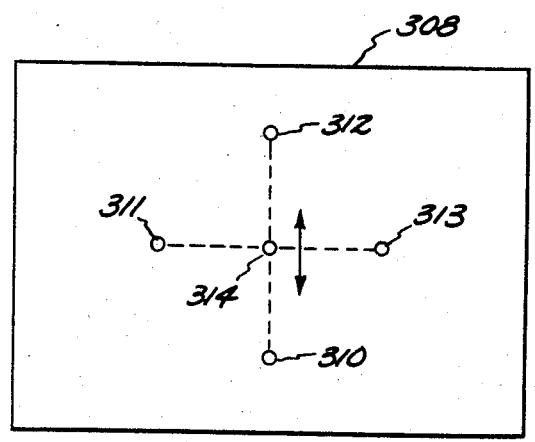
FIG. 12 is a front view of an oscilloscope display showing the indication obtained using the apparatus of FIG. 11.

Referring now to FIG. 12, an oscilloscope display of indicator 308 is shown. When the wheel has been heated sufficiently to create a clearance, oscilloscope 308 is adjusted to produce a spot at a low position 310 on its face. If the hydraulic system is actuated at this time to raise the wheel being heated, when the wheel reaches its uppermost position, the spot on oscilloscope 308 moves to an upper position 312. It would be clear that a centered position of the wheel on the shaft which provides equal clearance both above and below the shaft would exist if the hydraulic system were adjusted to lower the wheel so that the oscilloscope spot is in an intermediate position 314 centered between low position 310 and upper position 312. If the hydraulic system is adjusted to produce this display, and then control valves 278 and 278' are closed, the fluid pressure thus captured produces a combined force from pistons 137 and 137' which exactly supports the weight of the wheel and the elements attached to it with equal top and bottom clearance between the wheel and the shaft. When this condition is attained, the wheel can be withdrawn employing puller 220 (FIG. 3) as previously described.

In addition to the top/bottom centering process described above, the present invention may also be employed to achieve side-to-side centering of the wheel in its clearance with the shaft. In order to accomplish side-to-side clearance adjustment, a second proximity sensor may be positioned as previously described except that the position is preferably at a side-most location so that horizontal motion of the wheel may be sensed. Horizontal motion of the oscilloscope spot in response to adjustment of jack screws 208 and 208' may be controlled by this second proximity sensor in the manner described above between an extreme left position 311 and an extreme right position 313.

Referring again momentarily to FIG. 9, it would be clear to one skilled in the art that a hard hydraulic system without the use of accumulators such as accumulators 286 and 286' may be employed if a feedback control system is used. Such a hard hydraulic system may, for example, make use of the output of a proximity sensor to actively center the wheel on the shaft. Since a feedback control system of this sort would be immediately recognized by one skilled in the art, a full description thereof is omitted.

Referring again to FIG. 3, once the clearance has been attained in the manner described in the preceding, puller 220 draws handling spool 138, wheel 44 and electric oven 60 toward end 224 of shaft 12 rolling on wheels 120 of handling trolley 118. As soon as wheel 44 passes off the mating diameter of shaft 12, sections 62 and 64 of electric oven 60 are removed and puller 220 is removed. Handling trolley 118 is then moved further in the leftward direction in FIG. 3 to displace wheel 44 completely off shaft 12. At that point, it is possible to rotate wheel 44 and handling spool 138 about shaft 204 (FIG. 6) using upending hydraulic cylinder 200. Upending hydraulic cylinder 200, piston rod 202, pivot 201 and hinge 203 are preferably duplicated on the opposite side of the apparatus but are not seen in FIG. 3 because they are hidden by foreground objects.

FIG. 13 shows wheel 44 on the supporting structure after it has been fully removed from shaft 12, sections 62 and 64 of the oven and the puller have been removed and wheel 44 has been upended or rotated ninety degrees about shaft 204 by contraction of upending hydraulic cylinder 200 to place its axis in the vertical position. In this position, insulating layers 234 and 240 can be removed, wheel hooks 147 can be loosened and removed and wheel 44 can be attached to a conventional crane sling and hoisted away leaving adapter ring 142, octagonal section 90 and the remainder of the assembly available for use in the next wheel removal operation.

In reassembly, turbine wheel 44 (as a representative of the turbine wheels being assembled) is lowered onto adapter ring 142 and clamped in place using wheel hooks 147. Insulating layers 234 and 240 are installed and sections 62 and 64 of electric oven 60 are installed over octagonal section 90 either in the horizontal position shown in FIG. 13 or after handling spool 138 and wheel 44 have been rotated into the horizontal-axis position by upending hydraulic cylinder 200. Heating is performed in a program similar to that recited for the disassembly procedure.

Once the wheel is heated, handling trolley 118 is moved toward shaft 12 (refer to FIG. 3) until wheel 44 moves onto shaft 12 and approaches its mating diameter. The soft hydraulic system of FIG. 9 may thereupon be adjusted to align the height of wheel 44 in the Y direction with the mating diameter. Jack screws 208 and 208″ may be adjusted to displace the wheel left or right until alignment is attained along the X axis and then tightened to stiffen this axis. Wedges 180 and 185 in soft bearing assemblies 154 are adjusted to align the axis of wheel 44 with the axis of shaft 12 and to achieve firm guiding contact with the surface of shaft 12. If it is necessary to rotate the wheel slightly to align a keyway, this can be performed by altering the pressure in one or both of pistons 137 and 137′. Advantage may be taken of a proximity sensor and other appropriate measuring devices to help establish the proper alignment along the X and Y axes. Once appropriate alignment (FIG. 17) and support is attained, the jack screws are loosened and the wheel 44 is slid into place on its mating surface on shaft 12.

Wheel 44 cannot be left stationary on shaft 12 while wheel 44 cools and shrinks about the mating surface. Referring to FIG. 14, if heated and expanded wheel 44 is merely rested on cooler shaft 12, the upper portion of shaft 12 can be expected to expand to a greater extent than the lower portion. This is illustrated in the figure by a greatly exaggerated bend in shaft 12. When the clearance shrinks and disappears, the kink or bend in shaft 12 may be locked in by the shrink-fit and the shaft will thereafter be out of alignment. A conventional solution to this problem may include rotating shaft 12 and wheel 44 during the cooling and shrinking process. For this purpose, an auxiliary motor and roller, hydrostatic or hydrodynamic bearings must be provided to permit the shaft to rotate.

The present invention provides means for equalizing the heating of shaft 12 without rotating rotor 10. Referring to FIG. 15, wheel 44 is cyclically moved up and down by cyclically increasing and decreasing the fluid pressure in the soft hydraulic system previously described so that the opening in wheel 44 is moved from its furthest downward position shown in solid line in contact with the upper perimeter of shaft 12 to its uppermost position shown in dashed line in contact with the lower perimeter of shaft 12. The contact pressure or contact duration at the top and bottom extremities of motion can be made equal or unequal as required to produce even top and bottom shaft expansion. Up and down control of wheel 44 may be guided or controlled by a measurement of shaft straightness employing conventional means for measuring straightness (not shown). Satisfactory control of shaft straightness may be achievable by holding the wheel steady in the center of its clearance out of contact with the shaft (FIG. 17) using the sensing and handling apparatus and methods of the present invention.

Referring to FIG. 16, a further embodiment employs orbiting wheel 44 about shaft 12 so that contact is made between shaft 12 and wheel 44 about their full circumferences as indicated by the solid and dashed lines representing several of the positions assumed by the opening of the wheel 44 about shaft 12. In order to accomplish orbiting in this fashion, jack screws 208 and 208′ of FIG. 6 may be cyclically actutated or they may be replaced by hydraulic cylinders or other actuators (not shown) which may be driven by a cosine function while pistons 137 and 137′ are driven by a sine function. It would be clear to one skilled in the art that driving wheel 44 along X and Y axis with sinusoidal functions in this way accomplishes the orbital motion of FIG. 16.

Although the present invention has been described using an electrically resistance heated oven, and that is, in fact, the preferred embodiment, one skilled in the art would recognize that the handling and heating control herein described may desirably be employed using electrical induction or also gas heating to elevate the wheel temperature in a controlled manner in situations where the negative environmental aspects of gas heating can be tolerated. When gas heating is employed, surface temperature monitoring of the wheel provides temperature signals which are then used to control the supply of heating gas to controlled zones which may be analogous to the electrical zone heating control recited hereinabove.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A method for radially centering a wheel on a shaft along at least one radial axis comprising the steps of:
   radially displacing said wheel along said radial axis to a first position of contact between said wheel and said shaft;
   radially displacing said wheel along said radial axis to a second position of contact between said wheel and said shaft, said second position being angularly spaced 180 degrees from said first position; and
   radially displacing said wheel along said radial axis to a third position substantially midway between said first and second positions whereby said wheel is radially centered on said shaft along said radial axis.

2. A method for equalizing heating of a shaft during shrink-on of a heated wheel upon said shaft comprising:

cyclically displacing said wheel along at least a first radial axis of said shaft between a first position of contact therebetween and a second position of contact therebetween, said first and second positions being angularly displaced 180 degrees apart; and cyclically maintaining contact in said first and second positions for relative times effective to equalize said heating of said shaft at least at said first and second positions.

3. A method for equalizing heating according to claim 2 wherein the step of cyclically displacing includes cyclically displacing said wheel along a second radial axis of said shaft, said second radial axis being at right angles to said first radial axis, the displacement along said first and second axes being sinusoidal with a phase relationship displaced 90 degrees from each other whereby said wheel orbits in contact with said shaft.

4. A method for equalizing heating of a shaft during shrink fitting of a wheel thereon, wherein said wheel is prepared by being heated to a temperature substantially higher than a temperature of said shaft whereby an axial hole in said wheel is expanded to a diameter greater than a mating diameter on said shaft comprising the steps of:

radially displacing said wheel along said radial axis to a first position of contact between said wheel and said shaft;

determining said first position;

radially displacing said wheel along said radial axis to a second position of contact between said wheel and said shaft, said second position being angularly spaced 180 degrees from said first position;

determining said second position;

radially displacing said wheel along said radial axis to a third position substantially midway between said first and second positions whereby said wheel is radially centered in said clearance on said shaft out of contact with said shaft; and maintaining said wheel in said third position while said wheel cools and a shrink fit is established.

5. Apparatus for radially centering a wheel in a clearance on a shaft comprising:

indicating means affixed to one of said wheel and said shaft for indicating a displacement along at least one axis of the other thereof;

means for radially displacing said wheel along said at least one axis with respect to said shaft from a first tangential contact at which said indicating means provides a first indication to a second tangential contact angularly spaced apart 180 degrees from said first tangential at which said indicating means provides a second indication contact;

said means for radially displacing including means for radially displacing said wheel to a radial position intermediate said first and second radial positions wherein said indicating means provides a third indication intermediate said first and second indications.

6. Apparatus according to claim 5 wherein said indicating means includes a proximity sensor.

7. Apparatus according to claim 6 wherein said indicating means includes an oscilloscope responsive to said proximity sensor for displaying a position of said wheel with respect to said shaft.

8. Apparatus according to claim 6 wherein said first, second and third indications include first, second and third position displays on said oscilloscope.

9. Apparatus according to claim 5 wherein said means for radially displacing includes a soft hydraulic system.

10. Apparatus according to claim 5 wherein said at least one axis includes first and second angularly spaced apart axes.

11. Apparatus for equalizing heating of a shaft during shrink-on of a heated wheel upon said shaft comprising:

means for cyclically displacing said wheel along at least a first radial axis of said shaft between a first position of contact therebetween and a second position of contact therebetween, said first and second positions being angularly displaced 180 degrees apart; and means for cyclically maintaining contact in said first and second positions for relative times effective to equalize said heating of said shaft at least at said first and second positions.

12. Apparatus according to claim 11 wherein said means for cyclically displacing includes second means for cyclically displacing said wheel along a second radial axis of said shaft, said second radial axis being at right angles to said first radial axis, the displacement along said first and second axes being sinusoidal with a phase relationship displaced 90 degrees from each other whereby said wheel orbits in contact with said shaft.

* * * * *